(12) United States Patent
Riggle

(10) Patent No.: US 6,185,716 B1
(45) Date of Patent: Feb. 6, 2001

(54) DUAL DETECTOR READ CHANNEL WITH SEMI-SOFT DETECTION

(75) Inventor: C. Michael Riggle, Colorado Springs, CO (US)

(73) Assignee: Maxtor Corporation, Longmont, CO (US)

(*) Notice: Under 35 U.S.C. 154(b), the term of this patent shall be extended for 0 days.

(21) Appl. No.: 09/016,550

(22) Filed: Jan. 30, 1998

(51) Int. Cl.[7] .................................................. G11C 29/00
(52) U.S. Cl. ............................................. 714/769; 360/65
(58) Field of Search ............................. 714/769; 360/46, 360/65; 364/488, 825; 341/59; 375/233; 708/323

(56) References Cited

U.S. PATENT DOCUMENTS

| | | | |
|---|---|---|---|
| 5,031,194 | * 7/1991 | Crespo et al. | 375/12 |
| 5,193,102 | * 3/1993 | Meidan | 375/1 |
| 5,430,661 | 7/1995 | Fisher et al. | 364/488 |
| 5,546,430 | * 8/1996 | Liao et al. | 375/341 |
| 5,550,683 | 8/1996 | Koren | 360/46 |
| 5,583,706 | 12/1996 | Dudley et al. | 360/46 |
| 5,606,464 | 2/1997 | Agazzi et al. | 360/46 |
| 5,625,632 | 4/1997 | Ishida et al. | 714/769 |
| 5,650,954 | 7/1997 | Minuhim | 364/825 |
| 5,774,285 | * 6/1998 | Kassb et al. | 360/31 |
| 5,825,832 | * 10/1998 | Benedetto | 375/341 |
| 5,917,670 | * 3/1999 | Scaramuzzo et al. | 360/53 |
| 5,956,195 | * 9/1999 | Brickner et al. | 360/65 |
| 6,009,391 | * 12/1999 | Asghar et al. | 704/243 |
| 6,011,796 | * 1/2000 | Rezaiifar et al. | 370/394 |
| 6,012,161 | * 1/2000 | Ariyavisitakul et al. | 714/795 |

OTHER PUBLICATIONS

Oh, et al. (Blind Decision Feedback Equalizer Using Dual–Variance Gaussian Clustering Algorithm for Wireless Communications, IEEE, 1996).*

Bergmans, et al. (Dual Decision Feedback Equalizer, IEEE, 1997).*

Thielecke (A Soft–Decision State–Space Equalizer for FIR Channels, IEEE, 1997).*

Liu (Performanceof Adaptive Equalization and Soft–Decision Decoding Techniques over TDMA Digital Cellular Radio Channels, IEEE, 1992).*

Dahlman et al., Aug. 1988, *Electronics Letters*, "Performance Improvement in Decision Feedback Equalisers by Using 'Soft Decision'", 24(17):1084–1085.

Mita et al., "Automatic Equalizer for Digital Magnetic Recording Systems," *IEEE Transactions on Magnetics*, pp. 3672–3674, vol. Mag–23, No. 5 (Sep. 1987).

Wood, "New Detector for 1,k Codes Equalized to Class II Partial Response," *IEEE Transactions on Magnetics*, pp. 4075–4077, vol. 25, No. 5 (Sep. 1989).

Agazzi et al., "On the Use of Tentative Decisions to Cancel Intersymbol Interference and Nonlinear Distortion (with Application to Magnetic Recording Channels)," *IEEE Transactions on Information Theory*, pp. 394–408, vol 43, No. 2 (Mar. 1997).

Bergmans et al., "Dual Decision Feedback Equalizer," *IEEE Transactions on Communications*, pp. 514–518, vol. 45, No. 5 (May 1997).

* cited by examiner

*Primary Examiner*—Albert De Cady
*Assistant Examiner*—Guy Lamarre
(74) *Attorney, Agent, or Firm*—Sheridan Ross P.C.

(57) ABSTRACT

An apparatus for detecting data within a signal having both data and noise is disclosed herein. The apparatus includes means for receiving first samples of an input signal, a first detection unit and a second detection unit. The first detection unit processes the first data samples to create a first bit signal, a second bit signal and a probability related signal. The second detection unit includes first and second modification units and a selection unit. The first and second modification units separately modify the first data samples based on the first and second bit signals, respectively, to create first and second error signals, respectively. The selection unit selects one of the first and second bit signals based on the first and second error signals and a threshold signal.

11 Claims, 8 Drawing Sheets

DUAL DETECTOR READ CHANNEL WITH SEMI-SOFT DETECTION

FIELD OF THE INVENTION

The invention relates generally to the detection of data in noise and is particularly apt for use in digital data storage systems such as magnetic disk drive systems.

BACKGROUND OF THE INVENTION

It is generally true that data needs to be detected in a noisy and/or distorted input signal. For example, in a communications system, data is transmitted from a source location to a destination location via a transmission medium. While propagating through the medium, the data signal picks up noise from the medium and other sources. When the signal is received at the destination location, it is necessary to extract the data from the noisy signal. It is desired that the extracted data be identical to the data transmitted from the source location, but often errors will exist in the extracted data. As can be appreciated, if the detected data is not a sufficiently accurate representation of the transmitted information, the data will be of little or no use to the party receiving the data.

An equally demanding application that requires data to be detected from a noisy input signal is data storage. For example, in a magnetic disk drive system, data is stored as a coded series (i.e., a binary series) of magnetic transitions, frequently referred to as pulses, recorded on the surface of a magnetic disk. When data is transferred to and from the disk, the transitions nominally exhibit a Lorentzian shape, which is generally to a degree distorted. Some distortion is deterministic due to geometry of the head/media system. But, some is variable due to proximity of other transitions, localized deformities in the media, and irregular grain structure of the media. In addition, noise is added to the data signal from head (transducer) resistance, cable parasitics, and electronics. Collectively, noise and variable distortion tends to obscure the data.

As with communication systems, it is very important that the detected data in a data storage system be an accurate representation of the data that was originally stored on the media. To compensate for the occurrence of errors in the read data, most data storage systems apply error correction coding to the data before it is stored on the media. Then, if errors are present in the read data, the system is virtually always capable of correcting the errors before the data is delivered to the user. However, ECC coding adds overhead to the system that decreases the overall amount of user data that can be stored on a particular media, and it adds to system cost, both in proportion to the amount of ECC that must be applied to decrease detected error rates to an acceptable level.

Therefore, it is advantageous to develop a system for detecting data in a noisy and/or distorted signal that reduces the detected error rate. Such a system would be capable of operation with lower levels of error correction coding and would thus allow an increased amount of user data to be stored on a given storage medium.

SUMMARY OF THE INVENTION

The present invention relates to a detection system that is capable of detecting data in a noisy and/or distorted signal with higher than typical accuracy. That is, the system is capable of achieving data detection with a relatively low bit error rate for a given signal to noise ratio. Because noisier, more distorted signals can be tolerated for a given error rate, data can be more tightly packed on the disk surface.

The system of the present invention utilizes a dual detector approach to detect data in an input signal. That is, a first detector system performs an initial data detection on the input data signal and then a second detector system uses the output of the first detector system to reprocess the original input signal. The first detector system detects data in the input signal and creates both a primary bit string and a secondary bit string as a result. The primary bit string is the normal output signal of the first detector. The secondary bit string is similar to the primary bit string but has certain bits in the bit string (i.e., bits of low detection probability) changed by inversion. Subsequent bits in either bit string may also differ because of possible error propagation. The first detector system also outputs information related to the probability that the bits in the primary bit string have been properly detected.

The primary and secondary bit strings are delivered to first and second canceller units, respectively, within the second detector system. The two canceller units each also receive the original input data signal that was read from the media. The canceller units each modify the input data signal based upon a corresponding series of bits from the first detector system, such as by subtracting (alternatively, by adding) cancellation values from the data signal. In a preferred embodiment, the present invention uses a dual decision feedback equalizer (DFE) detector unit as the first detector and a dual canceller/multiplexer unit to perform the secondary detection.

The first detector system includes means for generating a flag signal whenever the magnitude of a modified data sample is less than a predetermined threshold level (i.e., between a positive and negative signal threshold which together create a quality threshold). As such, the flag signal identifies a data bit that has low detection probability. That is, it has higher probability of being in error than non-flagged bits. Note that, if a bit is truly in error, subsequent bits also exhibit higher error probability due to error propagation risk inherent in decision feedback detectors. The flag signal is used by the first detector system to determine whether to invert a corresponding bit in the secondary bit string. The flag signal is also delivered to the second detector system for enabling a possible alternative decision by the pair of canceller units. In addition to the flag signal, the first detector system creates a quality signal that is also related to bit detection probability of the questionable bit. The quality signal is delivered to the second detector system for determining a second threshold value which is used in combination with a margin signal (described below) in selecting the output of the second detector system.

As stated above, the two canceller units are operative for, among other things, modifying the original input data signal based upon a bit string received from the first detector system. In the preferred embodiment, this is done by subtracting a corresponding series of cancellation values from the data signal (or its functional equivalent). Each cancellation value subtracted from the data signal at a particular bit time is related to the output of the first detector system. That is, the cancellation value subtracted within the first canceller is chosen based upon the primary bit string and the cancellation value subtracted in the second canceller is chosen based upon the secondary bit string. In one embodiment, a pair of random access memories (RAMS) are used to store all of the possible cancellation values needed by the system. Each RAM is addressed using a series of bits extracted from the bit strings from the first detector system (i.e., the primary bit string in the first canceller and the secondary bit string in the second canceller).

When the low probability bit flag is raised, the canceller units each accumulate a squared error sum. Each error in the squared error sum is the difference between the actual modified sample input data and the expected modified sample values over a prescribed series of samples. When a squared error sum has been accumulated for the prescribed series of samples, a margin value for the dual canceller is calculated using the two error sums. In a preferred embodiment, the margin value is determined by finding the difference between the two error sums. The margin value is then compared to a second threshold value that is linearly related to the probability signal from the first detector for the original questionable bit. The comparison results in a select signal that is used to determine the output of the multiplexer and, hence, the second detector system.

The dual detector system of the present invention thus uses "semi-soft" detection to achieve a higher level of detection accuracy. Hard detection refers to a decision made by a detector that is automatically accepted by the system. Soft detection refers to the technique whereby two or more detector systems each make a tentative decision about a bit, or sequence of bits, and also generate a quality metric which gauges certainty of the tentative decision. The quality metrics are then compared to one another to make the final decision. Semi-soft detection, as used herein, refers to a system where hard decisions are made whenever a quality metric is above a particular threshold and soft decisions are made whenever the quality metric is below the threshold. In effect, a semi-soft detection system provides a second opinion whenever an original decision is questionable. Quality of the second opinion is then compared with quality of the original decision and a final decision is made which may or may not be the same as the original decision.

DETAILED DESCRIPTION

Figure 1:
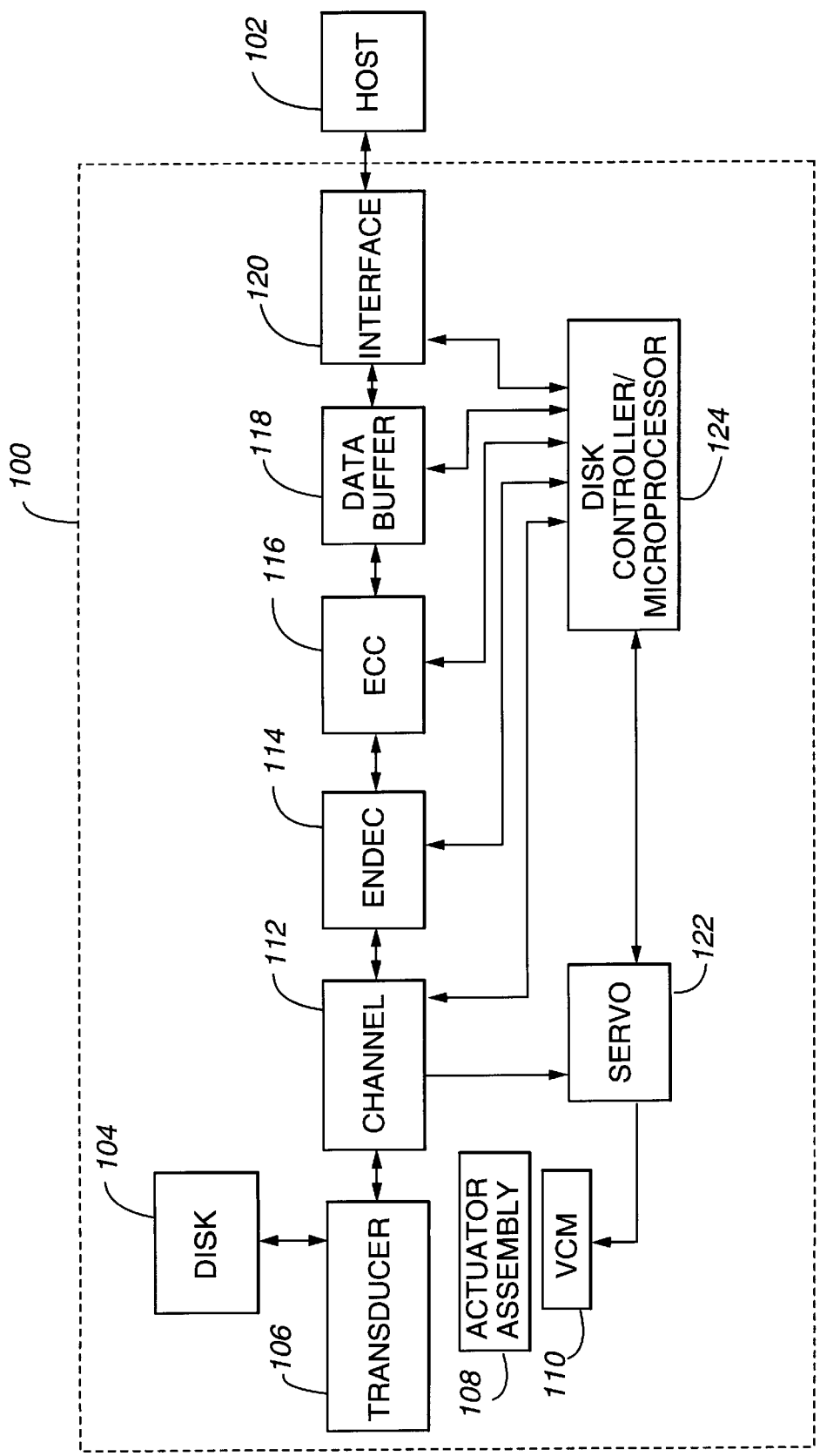
FIG. 1 is a block diagram of a magnetic disk drive system upon which the data detection scheme of the present invention can be implemented.

FIG. 1 illustrates an example of a magnetic disk drive system 100 that can implement the data detection scheme of the present invention. The disk drive system 100 is operative for performing data storage and retrieval functions for an external host computer 102. The disk drive system 100 includes: a disk 104, a transducer 106, an actuator assembly 108, a voice coil motor (VCM) 110, a read/write channel 112, an encoder/decoder (ENDEC) 114, an error correction coding (ECC) unit 116, a data buffer memory 118, an interface unit 120, a servo unit 122, and a disk controller/microprocessor 124. As described above, the disk 104 is a storage media used to store digital information in the form of magnetic polarity transitions (frequently referred to as pulses). The disk 104 is rotated at a substantially constant rate by a spin motor (not shown) that is speed-controlled by a closed-loop feedback system. As is well understood in the art, the system 100 can include a plurality of disks all mounted on a single spindle and each serviced by one or more separate transducers.

The transducer 106 is a device that transfers information from/to the disk 104 during read and write operations. The transducer 106 is positioned over the disk 104, typically, by a rotary actuator assembly 108 that pivots about an axis under the power of the VCM 110. During a write operation, a polarity-switchable write current is delivered to the transducer 106 from the read/write channel 112 to induce magnetic polarity transitions onto a desired track of the disk 104. During a read operation, the transducer 106 senses magnetic polarity transitions on a desired track of the disk 104 to create an analog read signal that is indicative of the data stored thereon. In a preferred embodiment of the present invention, the transducer 106 is a dual element head having a magnetoresistive read element and an inductive write element, although other functional structures may be equally acceptable.

The VCM 110 receives movement commands from the servo unit 122 for properly positioning the transducer 106 above a desired track of the disk 104 during read and write operations. The servo unit 122 is part of a feedback loop that uses servo information from the surface of the disk 104 to control the movement of the transducer 106 and the actuator assembly 108 in response to commands from the controller/microprocessor 124.

During a read operation, the channel 112 receives the analog read signal from the transducer 106 and processes the signal to create a digital read signal representative of the data stored on the disk 104. Therefore, if present, the detection circuitry of the present invention would be a part of the channel 112. The channel 112 may also include means for deriving timing information, such as a read clock, from the analog signal.

The ENDEC 114 is operative for: (1) encoding data being transferred from the host 102 to the disk 104, and (2) decoding data being transferred from the disk 104 to the host 102. Data being written to the disk 104 is encoded for a number of reasons, including those relating to timing and detection concerns. The ENDEC 114 can impart, for example, a run length limited (RLL) code on the data being written to the disk 104 to ensure that the frequency of transitions in the bit stream does not exceed or fall below predetermined limits. Such coding ensures that, among other things, enough transitions exist in the read data to maintain an accurate read clock. Other coding schemes may also be employed in the ENDEC 114.

The ECC unit 116 is operative for adding redundant information to the data from the host 102 before that data is encoded in the ENDEC 114 and written to the disk 104. This redundant information is used during subsequent read operations to permit discovery of error locations and values within the decoded read data. Errors in the read data detected by the read channel can result from any number of mechanisms, such as: (1) media noise due to media anomalies, (2) random noise from the transducer, cabling and electronics, (3) poor transducer placement reducing signal amplitude and/or increasing adjacent track noise during the read operation, (4) poorly written data due to media defects or poor transducer placement, and/or (5) foreign matter on the media or media damage. ECCs are generally capable of correcting up to a predetermined number of errors in a data block. If more than this number of errors exist, then the code will not be able to correct the errors but may still be able to identify that errors exist within the block. ECC functionality is generally implemented in a combination of hardware and software.

The data buffer memory 118 is used to temporarily store data for several purposes: (1) to permit data rates that are different between the disk drive and the host interface bus, (2) to allow time for the ECC system to correct data errors before data is sent to the host 102, (3) temporary parameter storage for the controller/microprocessor 124, and (4) for data caching.

The interface 120 is used to establish and maintain communication between the host 102 and the disk drive system 100. In this regard, all transfer of information into and out of the disk drive 100 takes place through the interface 120. The disk controller/microprocessor 124 is operative for controlling the operation and timing of the other elements of the system 100. In addition, the controller/microprocessor 124 may perform the functions of some of the elements of the system. For example, the controller/microprocessor 124 may perform the correction computation function of the ECC unit 116 if errors exceed the capability of hardware based units.

It should be appreciated that the above description of the disk drive system 100 represents a functional view of elements of a disk drive system, not a physical description. Many of the physical elements are today intermixed or distributed differently than the functional distribution. For example, certain of the servo functional elements are frequently physically intermixed with the read/write channel, and disk controller/microprocessor.

Figure 2:
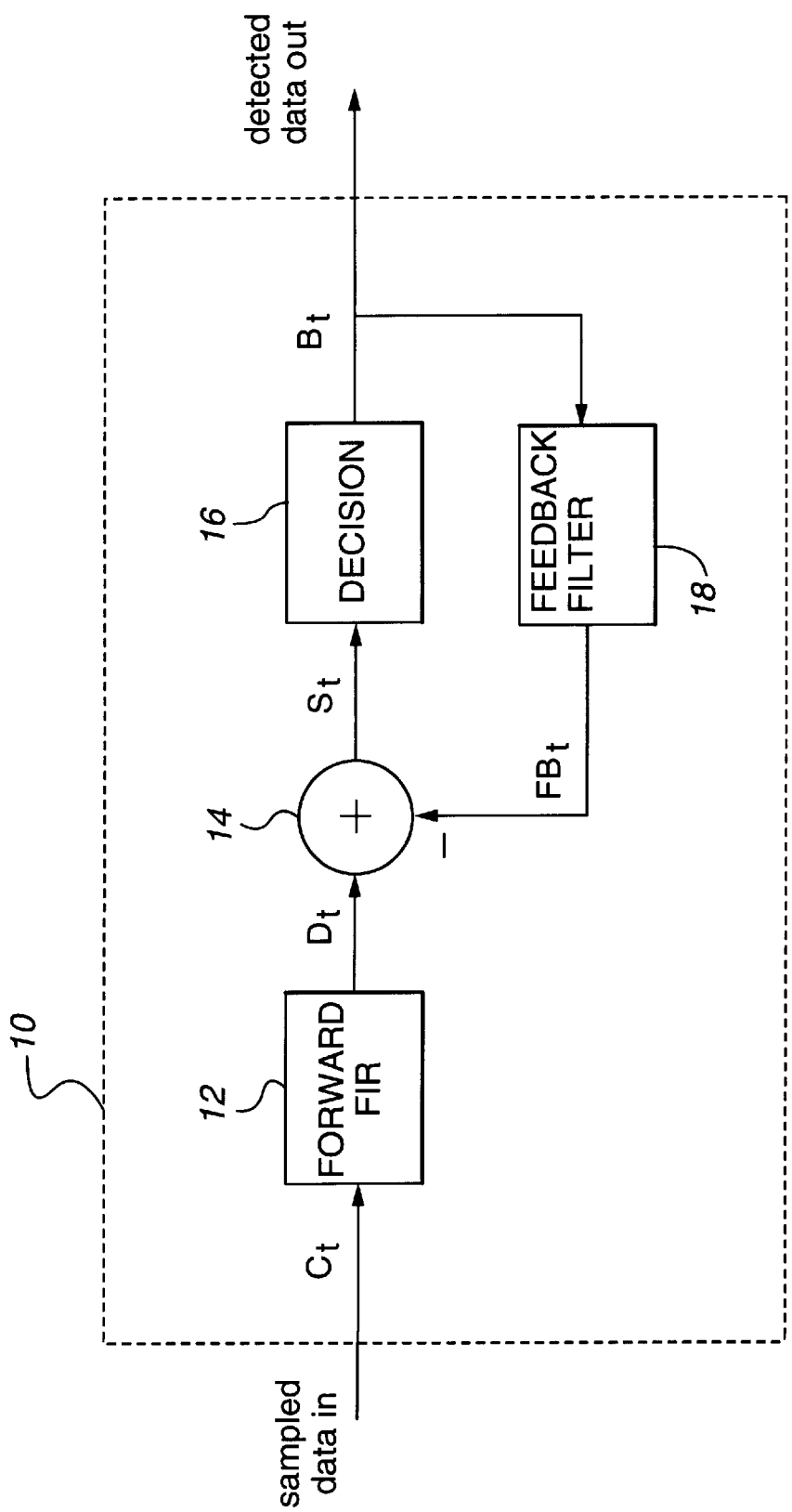
FIG. 2 is a block diagram of a conventional DFE detector system used to detect data in a magnetic disk drive.

FIG. 2 is a block diagram illustrating a conventional decision feedback equalizer (DFE) detector system 10 that can be used to detect data in a magnetic disk drive. Not shown are the preceding parts of the read channel used to amplify, control the amplitude, limit the incoming bandwidth, extract the clock, sample the data at the clock rate, and perhaps convert sampled analog signals to sampled digital signals. The term "sampled data in" (as shown in the figures) is defined to be data which has been amplified, low-pass filtered, clock-extracted and, perhaps, digitized. The DFE detector 10 of FIG. 2, if located in the disk drive system 100 of FIG. 1, would be located in the channel 112. The detector system 10 includes: a forward finite impulse response (FIR) equalizer 12, a subtracter 14, a decision unit 16, and a feedback filter 18. If the FIR uses sampled analog signals in lieu of sampled digital signals (as is sometimes done), an A to D (analog to digital) converter needs to be interposed between the FIR and subtracter. Alternatively, a sampled analog feedback filter 18 and subtracter 14 may be used. The FIR equalizer 12 receives digital or analog data samples C, that are derived from the analog read signal. The forward equalizer 12 processes the data samples $C_t$ according to a predetermined filter response function to create modified data samples $D_t$. The modified data samples $D_t$, are delivered to the subtracter 14 which further modifies the data samples by subtracting feedback values $FB_t$ (output of the feedback filter 18) from the data samples $D_t$ to create modified data samples $S_t$. The data samples $S_t$ are then fed to the decision unit 16 which applies a very simple detection algorithm to the modified data samples $S_t$ to create detected data signals $B_t$. It should be appreciated that the subscripts used to identify the data signals in FIG. 2 (i.e., t) correspond to the relative sample times of the data.

In the DFE detector system 10, the forward FIR equalizer 12 and the feedback filter 18 are used to shape the read signal data pulses, represented by the input data samples $C_t$, into a form desired by the decision unit 16. In general, this involves conversion of a "pulse" in the input sampled data into a desired "step response" that is easily processed by the decision unit 16. The forward equalizer 12 shapes the forward end of the data pulses to the desired shape leaving an extended trailing edge of the pulse. In general, noise is also "colored" (spectrally altered) in the process and is usually increased as well. The feedback filter 18 operates on the trailing end of the extended data pulses, in a process known as "noiseless" equalization, since noiseless digitized data is used to create the feedback filter 18 output values rather than noisy input data samples. The feedback filter 18 uses the detected output data bits $B_{t-1}$ to $B_{t-jmax}$ to create a filter output that adequately shapes the trailing end of the input pulses, jmax being an integer representing the maximum number of feedback coefficients. Note that a RAM (Random Access Memory) may be used in lieu of a linear FIR-like structure as the feedback filter 18. If so, bits $B_{t-1}$ to $B_{t-jmax}$ are used as RAM address bits. By adequately shaping the input data pulses $C_t$ before they reach the decision unit 16, a simplified form of decision unit 16 can be used, such as a simple slicer. In its simplest form, a slicer circuit determines whether an input signal is positive or negative.

The forward FIR equalizer 12 receives the input data samples $C_t$ and processes the samples according to the following equation:

$$D_t = \Sigma C_{t-k} E_k \quad k_{min} \leq k \leq k_{max}$$

where k is an integer and $E_k$ are the coefficients of forward FIR equalizer 12. At approximately the same time, the feedback filter 18 receives the detected output data bits from the decision unit 16 and, if a linear FIR-like filter, processes it according to the following equation:

$$FB_t = \Sigma B_{t-j} F_j \quad 1 \leq j \leq j_{max}$$

where $FB_t$ is the output signal of the feedback filter 18, $F_j$ are the linear feedback filter coefficients, and j is an integer. As described above, the output signal of the forward FIR equalizer 12 is input into the subtracter 14 which subtracts the output signal of the feedback filter 18 from it to create modified samples $S_t$ (i.e., $S_t = D_t - FB_t$). The decision unit 16 processes the modified data samples St according to a known detector function. The simple DFE detector function is:

$$B_t = \text{sign}(S_t)$$

where sign( ) is an operator that determines whether the operand is positive or negative. If the data is digitized in 2's complement notation, the output is merely the inverted sign bit of the subtracter and is already converted from the natural (−1,+1) non-return to zero (NRZ) format to digital (0, 1) format. If no other detector follows the DFE, data is transferred to the ENDEC 114 for decoding.

In the past, DFE detector systems such as the one illustrated in FIG. 2 were generally capable of detecting data in noise with relatively low bit error rate. However, as data densities rise, the error rate achieved by such systems begins to increase with increased levels of noise and variable distortion encountered. For example, nonlinear intersymbol interference (ISI) can significantly reduce accuracy of the detector 10. In addition, error propagation is significantly increased. Error propagation is a characteristic of decision feedback detectors where existence of an error may induce additional subsequent errors because of improper feedback equalization (recall that previously detected bits are used to calculate feedback equalization values).

Figure 3:
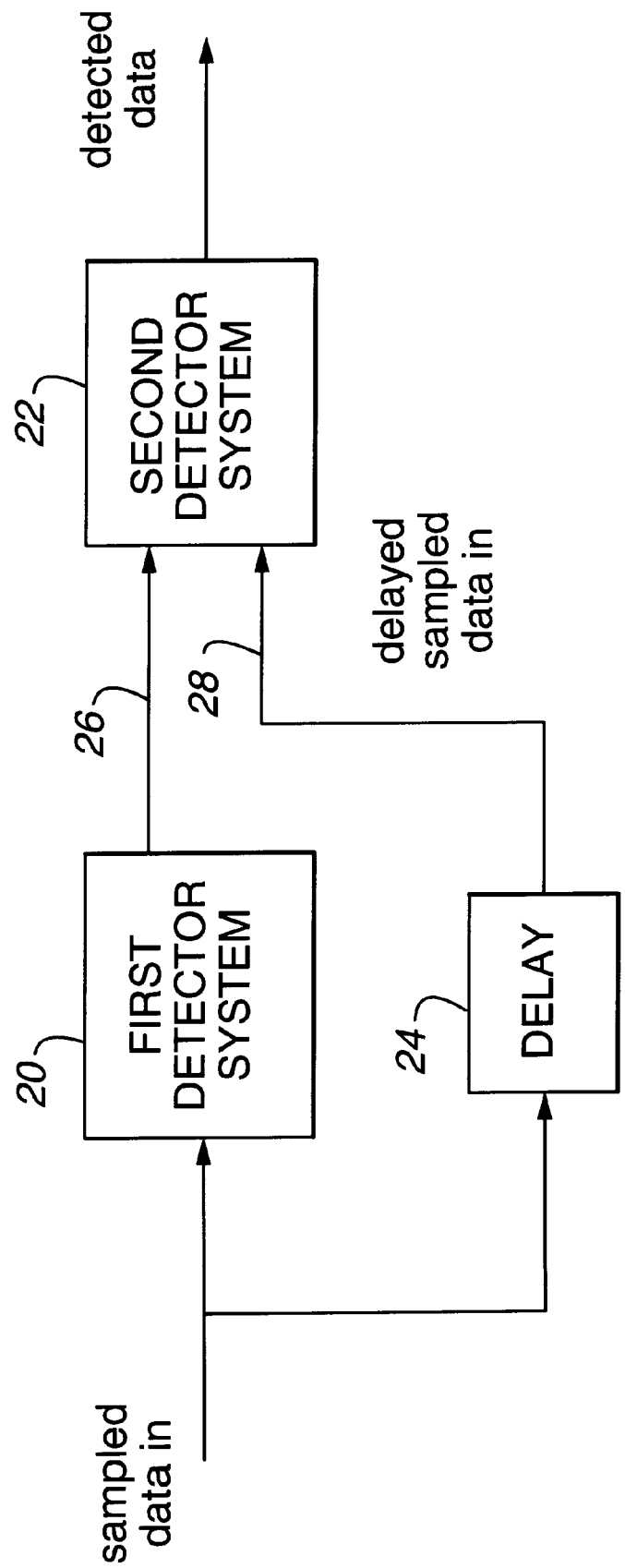
FIG. 3 is a block diagram of the dual detector system approach of the present invention.

To compensate for both noise and variable distortion, the system of the present invention implements a dual detector system approach as illustrated in FIG. 3. The approach utilizes a first detector system 20, second detector system 22, and a delay unit 24 to provide more accurate detection than that provided by a single DFE detector. The first detector system 20, which in the preferred embodiment includes a pair of DFE detectors, processes the input data samples and produces one or more signals, including detected data signals, that are delivered to the second detector system 22 via path 26. The second detector system 22 then independently processes the input data samples, which are received on path 28, using several signals from the first detector system 20. The delay unit 24 is used to delay the input data samples by an appropriate amount of time to account for processing time in the second detector system 22.

Figure 4:
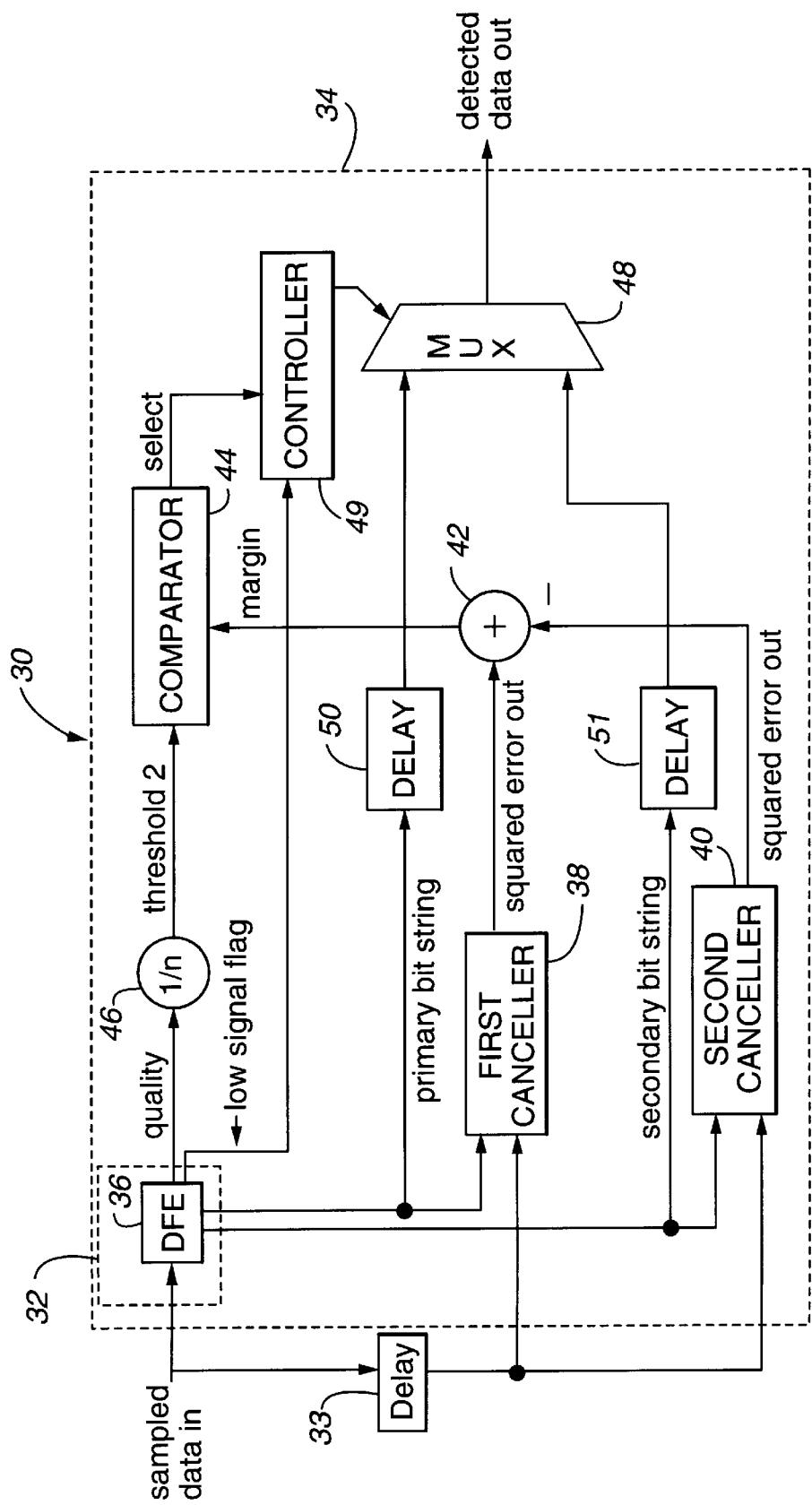
FIG. 4 is a block diagram of a dual detector system in accordance with one embodiment of the present invention.

FIG. 4 is a block diagram illustrating a detector system 30 in accordance with one embodiment of the present invention. The detector system 30 includes a first detector system 32, a delay unit 33 and a second detector system 34. The first detector system 32 includes a modified dual DFE detector unit 36 for performing initial detection on the input data samples (to be described in further detail in connection with FIG. 5A). The second detector system 34 includes: first and second canceller units 38, 40, a subtracter 42, a comparator 44, a threshold unit 46, a multiplexer 48, a controller 49, a first delay unit 50 and a second delay unit 51. As described above, and will be reviewed again below, the second detector system 34 receives various signals from the first detector system 32 and uses them to assist in processing the input data samples. Before describing the circuitry of the second detector system 34 in more detail, the configuration of the modified dual DFE detector unit 36 will be discussed.

Figure 5A:
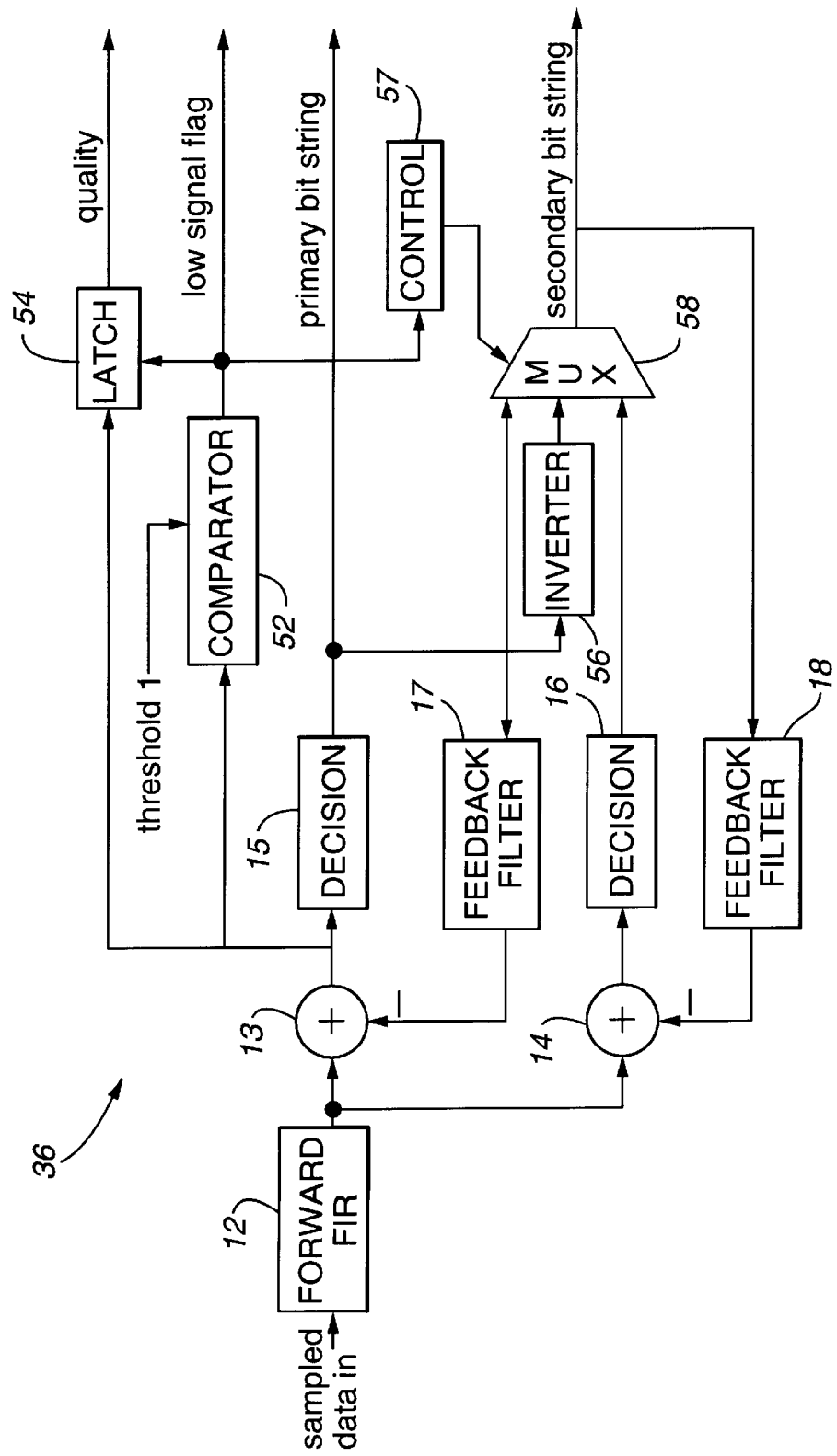
FIG. 5A is a block diagram of the internal circuitry of the modified dual DFE detector system of FIG. 4.

FIG. 5A is a block diagram illustrating the internal circuitry of the modified dual DFE detector system 36 of FIG. 4. As illustrated, the modified dual DFE unit 36 includes a forward FIR equalizer 12, first and second subtracters 13, 14, first and second decision units 15, 16, and first and second feedback filters 17, 18 (the first DFE unit comprising forward FIR equalizer 12, first subtracter 13, first decision unit 15 and first feedback filter 17; and, the second DFE unit comprising forward FIR equalizer 12, second subtracter 14, second decision unit 16 and second feedback filter 18). Each of the DFE units operates in substantially the same fashion as their counterparts in the DFE detector 10 of FIG. 2, except that the source of the detected bits for feedback filter 18 is modified. In addition, the modified dual DFE detector system 36 includes: a comparator 52, a latch 54, an inverter 56 and a multiplexer 58. The first decision unit 15 produces a detected signal in a manner similar to that described in connection with FIG. 2 above. This detected signal is available at an output of the DFE unit 36 and is called the primary bit string. The inverter 56 is operative for receiving the primary bit string and for inverting the bits of the bit string to create an inverted (or complemented) bit string. That is, the inverter 56 changes "logical ones" in the primary bit string to "logical zeros" and vice versa. The multiplexer 58 is operative for creating a secondary bit string by allowing, for each bit time, the present bit of the primary bit string, the inverted bit string or detected signal of second decision unit 16 to pass to an output port. The multiplexer 58 executes the selection function under the control of control unit 57. The control unit 57 makes the decision based upon a low signal flag from the comparator 52 which is described in more detail immediately below.

The comparator 52 receives the input data samples, modified by both the forward FIR equalizer 12 and the first feedback filter 17, as an input and compares magnitudes of the samples to a first threshold value, threshold 1, to create a low signal flag. The first threshold value can be either a constant or a variable value. A variable value allows for optimization based upon head, media, recording zone, and/or off-track position and can also be used for on the fly optimization. If the magnitude of a particular sample is less than the first threshold, the comparator 52 outputs a "logical one". If the magnitude of the sample is greater than or equal to the first threshold, the comparator 52 outputs a "logical zero". The low signal flag, therefore, is indicative of the magnitude of the data sample presently being input into the first decision unit 15 and, as such, is related to the probability that the first decision unit 15 will make a correct decision using the data sample. The multiplexer 58 passes the present bit of the primary bit string when the low signal flag is "logical zero". At the time when the low signal flag becomes a "logical one", the multiplexer passes an inverted bit from the primary bit string. Subsequently, for a selectable period of time (number of bits), the multiplexer passes bits from the second decision unit 16. During this time, the comparator 52 is also prohibited from passing any more low signal flags. When the period of time has elapsed, control reverts back to the comparator 52 and the low signal flag. In this way, the secondary bit string includes an inverted data bit in each bit position having a low decision probability followed by a series of detected bits based upon feedback equalization computed using the inverted and subsequent bits. The secondary bit string, therefore, represents a second possibility for proper detection. The bits are passed to minimize the likelihood of error propagation in the secondary bit string for cases where the inverted bit happens to be the valid bit. Alternatively, if the inverted bit is not the valid bit (i.e., the original bit was valid), the primary bit string will not likely be corrupted by error propagation. One of the two bit strings will therefore remain uncorrupted unless one or more additional error bits happen to occur within the selectable period of time (series of bits). It is possible to optimize the selectable period of time such that a trade-off between likelihood of additional error bits and error propagation minimizes the overall error rate. This can be done by trial and error while measuring the error rate as a function of selectable period of time.

Figure 5B:
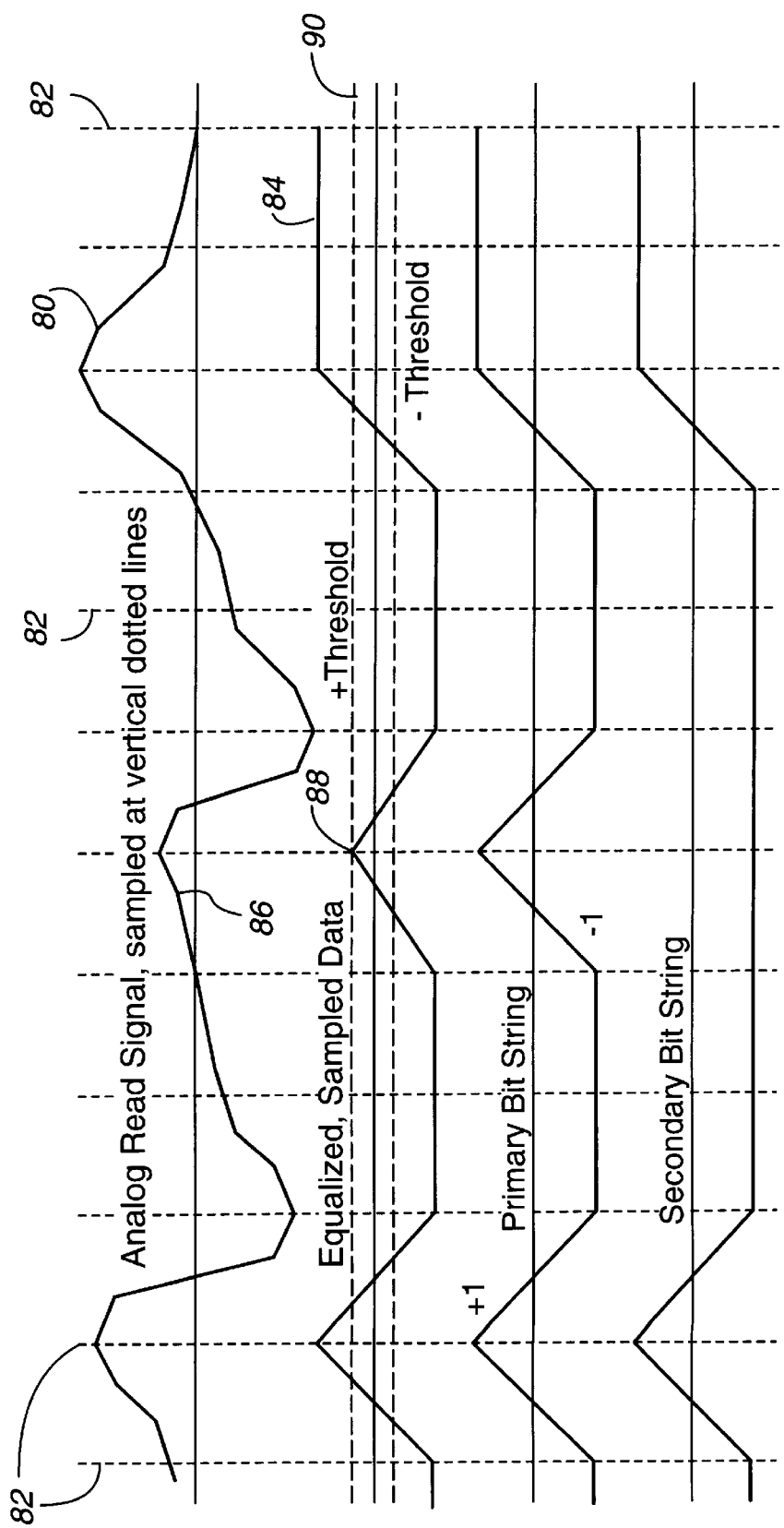
FIG. 5B is a diagrammatic representation of certain waveforms to illustrate the creation of primary and secondary bit strings.

FIG. 5B illustrates the creation of the primary and secondary bit strings, without any influence from detected bits from the second decision unit 16. That is, it only treats the system up to and through the bit inversion process. Waveform 80 represents an analog read signal that may be received from a transducer. The vertical dotted lines 82 represent the sampling times of the analog signal. Waveform 84 represents the modified sample data after equalization that is input into the first decision unit 15 of the modified dual DFE detector system 36 shown in FIG. 5A. As shown in FIG. 5B, the third pulse 86 of the analog read signal 80 has an amplitude that is less than the amplitude of the other pulses in the signal. This reduced amplitude in the analog read signal results in a reduced amplitude 88 in the modified data samples 84 that are input into the first decision unit 15 of FIG. 5A. The first decision unit 15, which is a slicer unit in the preferred embodiment, detects the reduced amplitude 88 of the modified data samples as a positive pulse in the analog read signal and indicates such in the primary bit string. However, because the amplitude 88 of the modified samples 84 does not exceed the positive threshold level 90 shown in FIG. 5B, the pulse indicated in the primary bit string is deemed a low probability pulse and the bit is therefore inverted in the secondary bit string.

Referring again to FIG. 5A, the low signal flag is also used by latch 54 which then stores the modified data sample at the input of the first decision unit 15 for use by second detector system 34 when a low signal determination is made. The output signal stored by the latch 54 is called the quality signal because it indicates the quality of the corresponding decision of the first decision unit 15. That is, the quality signal is related to the probability, as seen by the modified dual DFE detector system 36, that the corresponding bit in the detected data signal has been correctly detected. It can be shown that the quality signal is essentially proportional to the log likelihood ratio (LLR) for the corresponding detected bit. The LLR is the natural logarithm of the ratio between probability that a bit is a "logical one" and the probability that a bit is a "logical zero", i.e. LLR=1n[P(Bt=1)/P(Bt=0)]. The LLR is a desirable parameter to use as a quality metric in the present dual detector approach, in part, because it is readily available in both DFE and canceller type detectors.

With reference to FIG. 4, the second detector system 34 receives the primary and secondary bit strings, the low signal flag, and the quality signal from the first detector system 32. The low signal flag is received by the controller 49 which places the second detector system 34 into a "soft" decision mode whenever the low signal flag is a "logical one". In the soft mode, the second detector system 34 performs soft detection, as described more fully below, by comparing quality metrics from both the first and second canceller and the quality signal from the first detector system 32 and making a secondary decision based upon the comparison results. When the low signal flag is a "logical zero", which will be most of the time, the second detector system 34 is placed in a "hard" mode by the controller 49 and the output of the primary bit string is automatically sent to the final data output.

The soft mode of operation of the second detector system 34 will now be discussed. The first and second cancellers 38, 40 receive the primary and secondary bit strings from the first detector 32, respectively, and the delayed sampled input data from the delay 33. Each canceller 38, 40 then modifies the sample input data according to its respective input bit string. Each canceller 38, 40, when enabled by the low signal flag, also outputs a squared error signal indicative of the cumulative error between its actual modified data samples and the expected modified sample values over a prescribed series of samples. The subtracter 42 finds the difference between the two squared error signals to create a margin signal indicative of the margin of the second detector system 34. Note that if the margin signal is positive, it indicates disagreement between the first detector system 32 and second detector system 34. The primary and secondary bit strings are then input to the multiplexer 48 via first and second delay units 50, 51, respectively. The multiplexer 48, under the control of the controller 49, determines, for a series of questionable bits, which of the two multiplexer inputs to pass to the final data output and to the ENDEC 114 for decoding. The series of questionable bits is associated with the series of samples over which the squared error was accumulated.

The comparator 44 creates the select signal by comparing the margin signal generated by the subtracter 42 to a second threshold value, threshold2. The second threshold value is calculated by the threshold unit 46 and is preferably based upon the quality signal received from the first detector system 32. In the preferred embodiment, the second threshold value is simply a fraction of the quality signal (which, as described above, is a linear function of the LLR). As shown in FIG. 4, the margin signal generated by the subtracter 42 is the cumulative squared error signal from the second canceller 40 subtracted from the cumulative squared error signal from the first canceller 38. As such, the margin signal indicates the quality of the output data signal of the second canceller 40 vis-a-vis the first canceller 38. When the margin signal is positive and large (i.e., greater than the second threshold), it is determined that the modified data of the second canceller 40 is sufficiently more accurate than the modified data of the first canceller to justify overriding the decision of the first detector system 32. The comparator 44 then delivers a select signal to the controller 49 which directs the multiplexer 48 to pass the series of bits (selectable length series) from the secondary bit string to be delivered to the final output. Otherwise, the controller 49 directs the multiplexer 48 to pass bits from the primary bit string. In this way, the accuracy of questionable bits detected by the first detector system 32 are double-checked in the second detector system 34 and amended if the second detector system 34 finds them in error with enough certainty to override the decision of the first detector system 32.

Because the second dual canceller detector system 34 provides an inherently more reliable answer than the DFE detector system 36 on questionable decisions, the second threshold is scaled down from the quality signal of the DFE. For optimal detection accuracy of the detector system 30, a proper ratio must be established between the quality signal of the first detector system 32 and the threshold value of the second detector system 34. The ratio is most efficiently determined by a trial and error approach that monitors error rate for a multitude of different ratio values.

Figure 6A:
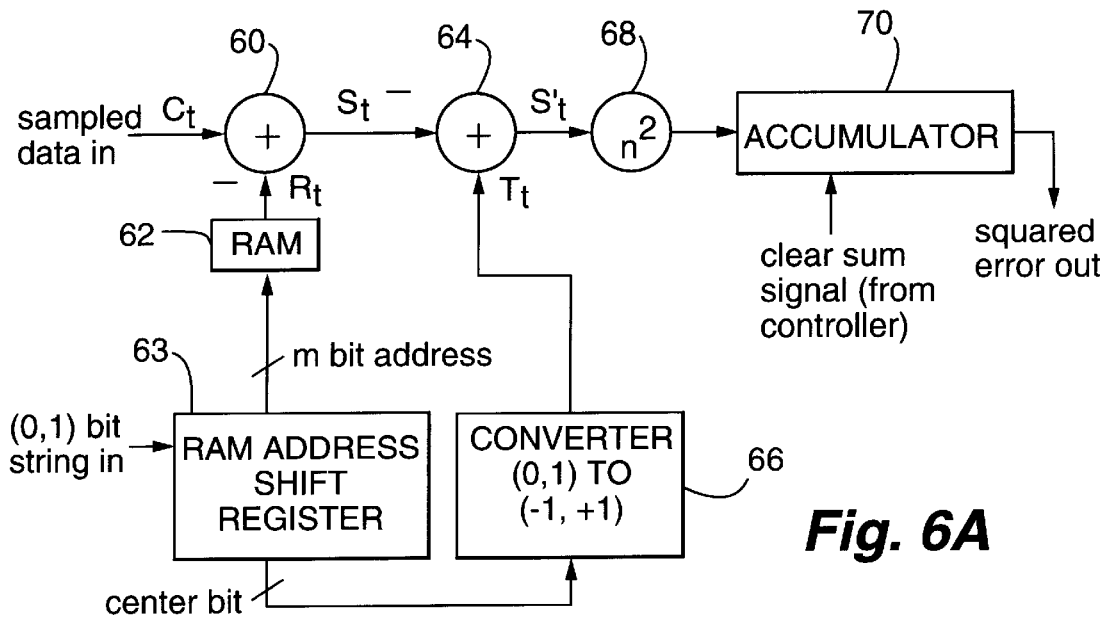
FIG. 6A is a block diagram of the internal circuitry of the two canceller units in accordance with one embodiment of the present invention.

FIG. 6A is a block diagram illustrating the internal circuitry of each of the two canceller units 38, 40 in accordance with one embodiment of the present invention. The canceller units 38, 40 each include: a first subtracter 60, a random access memory (RAM) 62, a RAM address shift register 63, a second subtracter 64, a converter unit 66, a squaring unit 68, and an accumulator unit 70. The RAM 62 stores the cancellation values that are used to modify the input data samples. The RAM 62 receives an address from the RAM address shift register 63 that contains a series of bits from the input bit string from the first detector system 32 (i.e., the primary bit string for the first canceller 38 and the secondary bit string for the second canceller 40) spanning bits on both sides of the sample currently being modified. The RAM address is used to retrieve from the RAM the most likely correct value required to modify the current sample. Hence, the cancellation value is based upon several previous and several subsequent bits related to the sample. Because the first and second bit strings are each used to address a RAM device, the first detector must output bits in the (0, 1) format (which it naturally does if inverted sign bit of the first detector's subtracter is used as its output). It should be appreciated that other methods of obtaining appropriate cancellation values, such as through use of a linear FIR function, can be used in accordance with the present invention. A RAM approach to cancellation is preferred, however, because it allows for nonlinear equalization, which may be important for non-linear disk drive recording systems.

The RAM values can be computed using any one of a number of different methods. In one method, the least mean squared (LMS) algorithm is used. The LMS algorithm computes the mean squared error between the desired modified canceller sample output and the actual modified canceller sample output, then gradually "tunes" the RAM contents until minimum mean squared error is achieved. In another possible method, direct calculation using a large set of sampled data is performed to compute RAM values. Non-linear equations, such as Volterra models, can also be used in lieu of real data in conjunction with either LMS or direct computation. The cancellation values in the RAM are usually specific to the head/media being used and therefore vary from head to head, media to media, and drive to drive. Separate cancellation values can also be provided on a zone by zone basis, if needed.

The first subtracter 60 subtracts the cancellation values retrieved from the RAM 62 from the associated input data samples to create modified data samples at an output. As described above, the subtraction of cancellation values is performed to create a desired step response in an output data signal for each pulse in the input samples.

Figure 7:
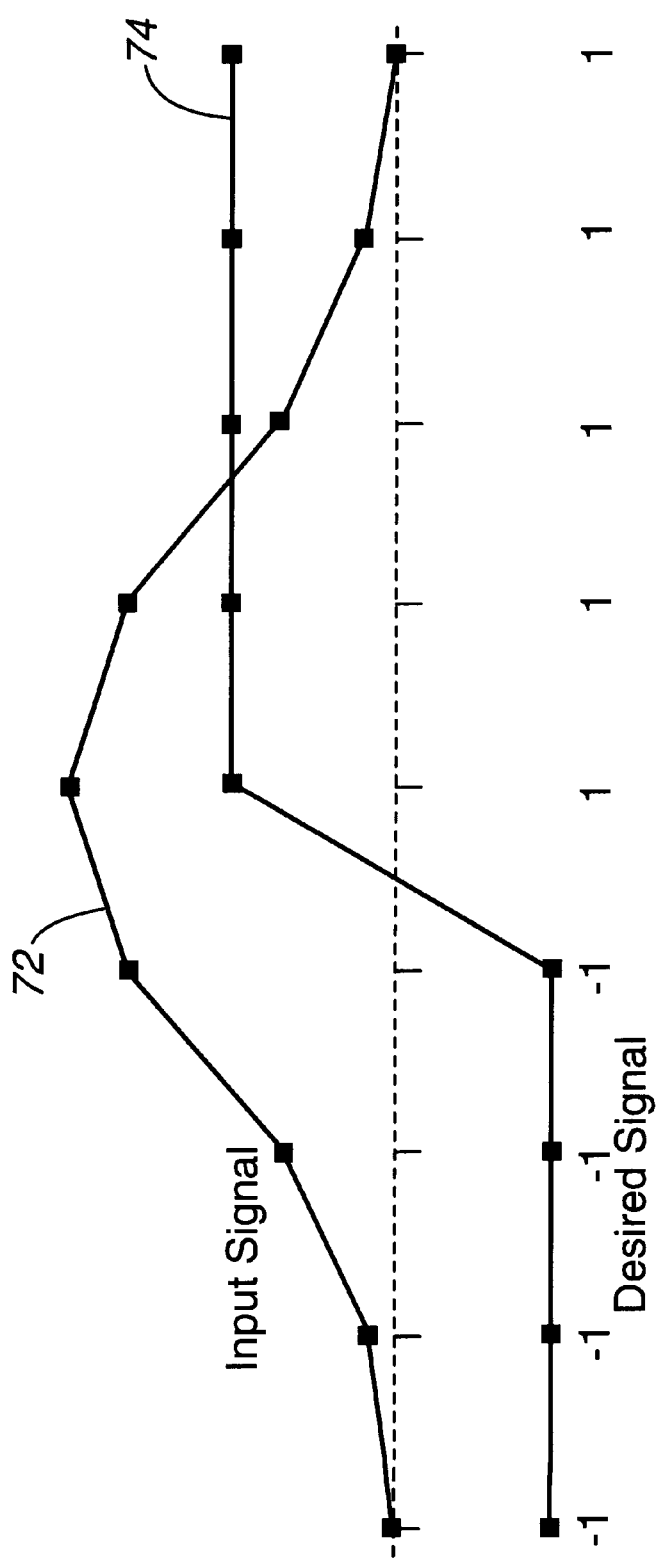

FIG. 7 is a graph illustrating the data samples before and after subtraction of cancellation value in a typical case. The first waveform 72 represents the data samples input into the canceller 38, 40. The second waveform 74 represents the modified data samples after the cancellation values have been subtracted. The data samples are shown using small boxes on the waveforms 72, 74 and the vertical marks along the horizontal axis of the graph represent the sample times. As shown, the subtraction of cancellation values transforms the pulse of the input data, which represents a single magnetic transition sensed by the read head, into a step function having a non return to zero (NRZ) format.

Referring again to FIG. 6A, the converter 66 is operative for converting the format of the input bit string (i.e., either the primary or secondary bit string) from a (0,1) format to an NRZ format. The output of the converter 66, therefore, represents the expected modified sample values based upon the bit string from the first detector system 32. The second subtracter 64 receives the modified data samples from the first subtracter 60 and subtracts them from the expected sample values output by the converter 66 (i.e., −1 or +1). The output of the second subtracter 64, which represents the deviation, or error, of an actual present modified sample value from an expected present modified sample value, is then squared in the squaring unit 68. The squared values from the squaring unit 68 are then summed and accumulated in the accumulator 70 over a predetermined number of bit times to produce a squared error signal. For best performance, the predetermined number of bit times should cover the range of bits that differ between the primary and secondary bit strings, plus additional bits that affect the RAM address, because any one RAM address bit in error may affect the squared error, hence quality of the decision. As described above, the squared error out signal is used to generate the margin signal for the second detector system 34, which is indicative of the quality of the canceller decision.

Figure 6B:
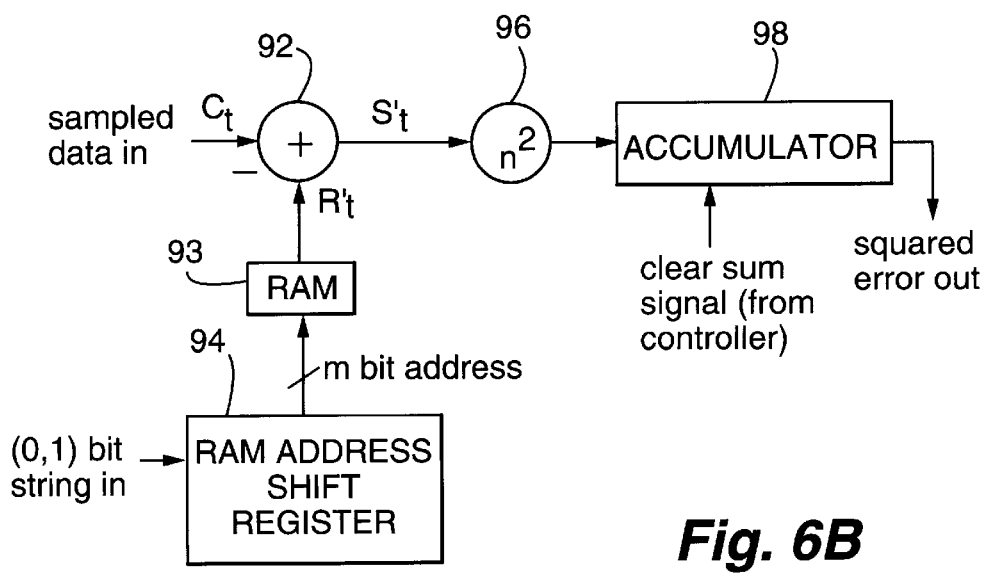
FIG. 6B is a block diagram of the internal circuitry of the two canceller units in accordance with another embodiment of the present invention; and, FIG. 7 is a diagrammatic representation of data samples before and after subtraction of a cancellation value.

Since only cumulative squared error signals are desired as an output of each canceller, an alternative architecture to that of FIG. 6A is shown in FIG. 6B. This architecture is functionally and arithmetically identical to that described in FIG. 6A, if values stored in the RAM 93 are modified accordingly. Instead of storing cancellation values, the sum of each cancellation value and the associated desired signal is stored at each RAM address. Doing so eliminates one subtracter (i.e., subtracter 64) and the converter 66. That is, if the output of the first subtracter in FIG. 6A is: $S_t = C_t - R_t$, where $C_t$ is input sample data and $R_t$ is the correction cancellation value at time t, and the output of the second subtracter is: $S'_t = T_t - S_t = T_t - (C_t - R_t) = (T_t + R_t) - C_t$, where $S'_t$ is the error signal and $T_t$ is the desired (target) signal level, both at time t, then $T_t + R_t$ can be pre-added and stored in the RAM (shown as $R'_t$ in FIG. 6B) in lieu of $R_t$, thus saving a subtracter and converter. The other functional elements in FIG. 6B, i.e., the squaring unit 96 and accumulator 98 are identical to units 68 and 70 in FIG. 6A, respectively. Because FIG. 6A may be more readily understandable, it was discussed first. However, the architecture in FIG. 6B is preferred.

FIG. 7 is used to more fully describe the cancellation process. It assumes a RAM with nine (9) address bits which implies that the RAM contains $2^9 = 512$ stored values. The RAM has certain cancellation values stored within it at each RAM address location. The cancellations values correspond, on a one to one basis, with each of the samples of the input data signal (shown as black boxes) of FIG. 7. Assuming that the input signal shown in FIG. 7 is a nominal isolated pulse signal, the cancellation value would be equal to the value required to be subtracted from the input signal to achieve the desired signal. For the leftmost sample shown in FIG. 7, the cancellation value would be 1. Viewing the input signal from left to right, the next sample would have a cancellation value of approximately 1.1, the following sample would have a cancellation value of approximately 1.6, and so on.

The RAM addresses where the above-mentioned cancellation values are stored have a center bit (in this case their fifth bit) which relates to the value of the desired signal corresponding with the bit of the input signal being cancelled (where a 0 bit corresponds to a desired signal value of −1 and a 1 bit corresponds to a desired signal value of 1). For example, the leftmost sample would have a RAM address which includes a 0 as its center bit, as would the second through fourth bit samples. Not until the fifth bit sample would a RAM address have a 1 as its center bit. Similarly, the sixth through ninth bit samples would include a RAM address having a 1 as their center bit.

The input signal shown in FIG. 7 has nine bit times and there are no preceding nor following pulses. Applying the above, the leftmost sample would have its canceller value located at RAM address 000000001. The next sample would have its canceller value located at RAM address 000000011. The sample corresponding to the center bit would have its canceller value located at RAM address 000011111. Finally, the rightmost bit sample shown in FIG. 7 would have its canceller value located at address 111111111.

Referring back to FIG. 4, the delay 33 merely offsets the expected sample value to account for the fact that bits both before and after the sample being modified are used by the RAM 62 to select the corresponding cancellation value.

Although the present invention has been described in conjunction with its preferred embodiment, it is to be understood that modifications and variations may be resorted to without departing from the spirit and scope of the invention as those skilled in the art readily understand. For example, in one possible modification, additional cancellers are added to the second detector to test additional possible bit strings and associated samples. This scenario also requires the generation of more than two bit strings by the first detector. In another possible modification, other types for first and second detectors are used in accordance with the present invention. The first detector, for example, can be any type of detector where errors of at least one bit string are mostly limited to single bits per error event. In a third possible modification, the inventive system can operate on analog data samples rather than digitized sampled data. Such modifications and variations are considered to be within the purview and scope of the invention and the appended claims.

What is claimed is:

1. An apparatus for detecting data within a signal having both data and noise, said apparatus for use in a data storage system, comprising:

means for receiving first data samples of an input signal;

a first detection unit for processing said first data samples to create a first bit signal, a second bit signal, and a probability related signal;

first and second modification units for separately modifying said first data samples based on said first and second bit signals, respectively, to create first and second error signals, respectively; and a selection unit for selecting one of said first or second bit signals based on said first and second error signals and a threshold signal.

2. The apparatus of claim 1, further comprising:

a multiplexer for processing said signal selected by said selection unit.

3. The apparatus of claim 1, wherein:

said first and second modification units include first and second cancellers respectively, for subtracting cancellation values from said first data samples.

4. The apparatus of claim 3, wherein:

said first and second cancellers include a random access memory (RAM) for storing said cancellation values.

5. The apparatus of claim 1, wherein:

said first and second error signals are squared error sums that are accumulated over a predetermined number of bit times.

6. The apparatus of claim 1, wherein:

said selection unit includes a subtracter for determining a difference between said first and second error signals.

7. The apparatus of claim 6, wherein:

said selection unit includes a comparator for comparing said difference to said probability related signal.

8. The apparatus of claim 1, wherein:

said first detection unit includes a pair of decision feedback equalizers.

9. The apparatus of claim 1, wherein:

said first bit signal and said second bit signal represent two possible detected data strings for the first data samples.

10. The apparatus of claim 1, wherein:

said threshold signal is calculated using said probability related signal.

11. The apparatus of claim 10, wherein:

said probability related signal is approximately proportional to a log likelihood that bits of the first bit signal are accurate.

* * * * *